(12) United States Patent  (10) Patent No.: US 8,021,259 B2
Hilker et al.  (45) Date of Patent: Sep. 20, 2011

(54) DIFFERENTIAL ASSEMBLY WITH OIL DEFLECTOR SHIELD

(75) Inventors: Gregory J Hilker, Canton, MI (US); Kevin R Beutler, Columbiaville, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 339 days.

(21) Appl. No.: 12/315,963

(22) Filed: Dec. 8, 2008

(65) Prior Publication Data

US 2009/0176614 A1    Jul. 9, 2009

Related U.S. Application Data

(60) Provisional application No. 61/018,987, filed on Jan. 4, 2008.

(51) Int. Cl.
*F16H 57/04* (2010.01)
(52) U.S. Cl. ...... 475/160; 475/159; 184/88.1; 184/88.2; 74/467; 74/468
(58) Field of Classification Search ............ 475/230, 475/159, 248, 160; 74/467, 468, 608, 609; 184/6.12, 6.27, 11.1, 13.6, 36, 70, 88.1, 88.2, 184/609, 109; 277/551, 572
See application file for complete search history.

(56) References Cited

U.S. PATENT DOCUMENTS

| 1,916,391 | A |  | 7/1933 | Shamberger |
| 2,015,108 | A |  | 9/1935 | Harper |
| 2,241,870 | A |  | 5/1941 | Scribner |
| 3,138,222 | A |  | 6/1964 | Dames |
| 3,502,177 | A |  | 3/1970 | Christie |
| 3,532,183 | A |  | 10/1970 | Shealy |
| 3,610,060 | A | * | 10/1971 | Hewko ............... 476/8 |
| 3,851,731 | A |  | 12/1974 | Jorgensen |
| 4,261,219 | A | * | 4/1981 | Suzuki et al. ............ 74/467 |
| 4,271,717 | A |  | 6/1981 | Millward et al. |
| 5,307,702 | A |  | 5/1994 | Spellman et al. |
| 5,456,476 | A | * | 10/1995 | Premiski et al. .......... 277/641 |
| 5,584,773 | A |  | 12/1996 | Kershaw et al. |
| 5,709,135 | A | * | 1/1998 | Baxter ................. 74/607 |
| 6,109,615 | A |  | 8/2000 | Gildea et al. |
| 6,345,712 | B1 | * | 2/2002 | Dewald et al. .......... 192/221 |

(Continued)

FOREIGN PATENT DOCUMENTS

GB       1115446 A      5/1968

(Continued)

*Primary Examiner* — Edwin A Young
*Assistant Examiner* — Huan Le
(74) *Attorney, Agent, or Firm* — Harness, Dickey & Pierce, P.L.C.

(57) ABSTRACT

An axle assembly that includes a housing assembly, a lubricant and a differential assembly. The housing assembly defines a differential cavity with a lubricant sump into which the liquid lubricant is received. The differential assembly is mounted in the differential cavity for rotation about a rotational axis and includes a differential case, a ring gear, a gear set and an oil shield. The differential case has a body, which defines a gear cavity into which the gear set is received, and a flange that is coupled to the body and includes a flange face. The ring gear is coupled to the flange. The oil shield is coupled for rotation to the differential case and covers a least a radially outward portion of the circumferentially discontinuous features so that they do not directly contact the liquid lubricant in the lubricant sump when the differential assembly rotates about the rotational axis.

20 Claims, 5 Drawing Sheets

U.S. PATENT DOCUMENTS

| | | |
|---|---|---|
| 6,997,284 B1 | 2/2006 | Nahrwold |
| 7,140,995 B2 | 11/2006 | Mierisch et al. |
| 7,178,426 B2 * | 2/2007 | Turner et al. ............... 74/607 |
| 2005/0070394 A1 * | 3/2005 | Sugeta et al. ............. 475/230 |
| 2008/0073152 A1 * | 3/2008 | Eleftheriou et al. ........ 184/6.12 |
| 2010/0105513 A1 * | 4/2010 | Hilker et al. .............. 475/160 |

FOREIGN PATENT DOCUMENTS

JP  60164046 A  *  8/1985

* cited by examiner

DIFFERENTIAL ASSEMBLY WITH OIL DEFLECTOR SHIELD

CROSS-REFERENCE TO RELATED APPLICATIONS

This application claims the benefit of U.S. Provisional Application No. 61/018,987, filed on Jan. 4, 2008. The entire disclosure of the above application is incorporated herein by reference.

The present invention generally relates to axle assemblies and more particularly to an axle assembly having an oil deflector shield that can be employed to reduce "oil paddling" as portions of a differential assembly of the axle assembly rotate through a liquid lubricant in a sump of an axle housing assembly.

Modern automotive axle assemblies typically include a differential assembly that is mounted for rotation in an axle housing assembly. The axle housing assembly typically defines a sump in which a liquid lubricant is received. During operation of the axle assembly, portions of the differential assembly, such as a differential case and/or a ring gear, will rotate through the liquid lubricant in the sump, permitting some of the liquid lubricant to cling to the differential assembly as the portion of the differential assembly rotates out of the liquid lubricant. The liquid lubricant that clings to the differential assembly can be slung outwardly from the differential assembly due to circumferential force; the slung lubricant can be employed to lubricate various portions of the axle assembly, including differential bearings, pinion bearings, differential gears (e.g., pinion and side gears), etc.

U.S. Pat. No. 5,584,773 appears to disclose an axle assembly in which the ring gear is received into a shroud that is fixedly coupled to a non-rotating portion of the axle assembly, such as the housing. The '773 patent describes the shroud as "[surrounding] the bevel [i.e. ring] gear in very close proximity thereto and [encapsulating] the bevel gear in the area that is immersed in the reservoir". The '773 patent characterizes this arrangement as "greatly [reducing] the churning of the fluid within the reservoir." It will be appreciated that since the channel is open, lubricant can collect in the channel. Consequently, the device of '773 patent does not eliminate "churning" of the fluid in the reservoir and can adversely affect the lubrication of the various parts of the axle assembly.

SUMMARY

In one form, the present teachings provide an axle assembly that includes an axle housing assembly and a differential assembly. The differential assembly is mounted in the axle housing for rotation about a rotational axis. The differential assembly includes a differential case, a ring gear, a gear set and an oil shield. The differential case has a body and a flange. The body defines a gear cavity. The flange is coupled to the body and includes a plurality of radially outwardly extending rib members. The ring gear is coupled to the flange. The gear set is received in the gear cavity. The oil shield is coupled for rotation to the differential case and covers at least a portion of the rib members. The at least the portion of the rib members includes a radially outward end of the rib members.

In another form, the present teachings provide an axle assembly that includes an axle housing assembly, a liquid lubricant and a differential assembly. The axle housing assembly defines a differential cavity with a lubricant sump into which the liquid lubricant is received. The differential assembly is mounted in the differential cavity for rotation about a rotational axis. The differential assembly includes a differential case, a ring gear, a gear set and an oil shield. The differential case has a body, which defines a gear cavity, and a flange that is coupled to the body and includes a flange face. The ring gear is coupled to the flange. The gear set is received in the gear cavity. The oil shield is coupled for rotation to the differential case. The oil shield covers a least a radially outward portion of the circumferentially discontinuous features so that the at least the radially outward portion of the circumferentially discontinuous features does not directly contact the liquid lubricant in the lubricant sump when the differential assembly rotates about the rotational axis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
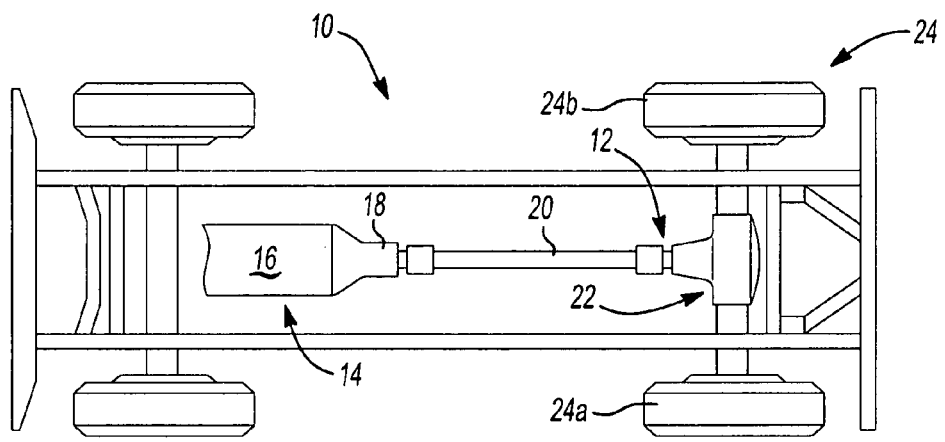
FIG. 1 is a schematic illustration of an exemplary vehicle having a rear axle constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a propshaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis. The transmission 18 can also include an output and a gear reduction unit. The gear reduction unit can be operable for coupling the transmission input to the transmission output at a predetermined gear speed ratio. The propshaft 20 can be coupled for rotation with the output of the transmission 18. Drive torque can be transmitted through the propshaft 20 to the rear axle 22 where it can be selectively apportion in a predetermined manner to the left and right rear wheels 24a and 24b, respectively.

Figure 2:
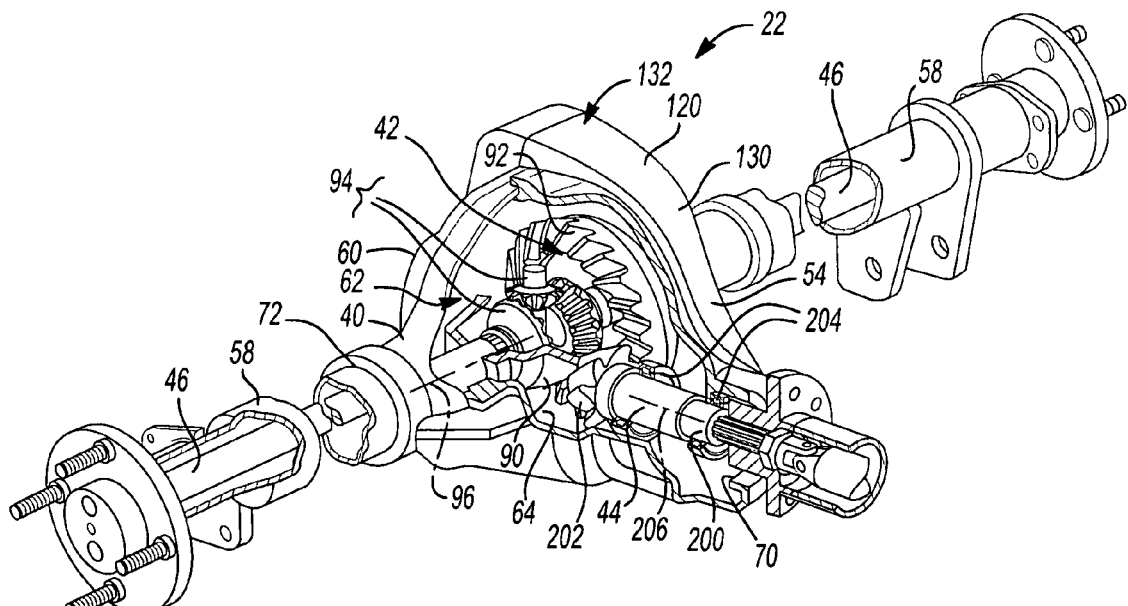
FIG. 2 is a partially broken away perspective view of a portion of the vehicle of FIG. 1 illustrating the rear axle in more detail.
Figure 3:
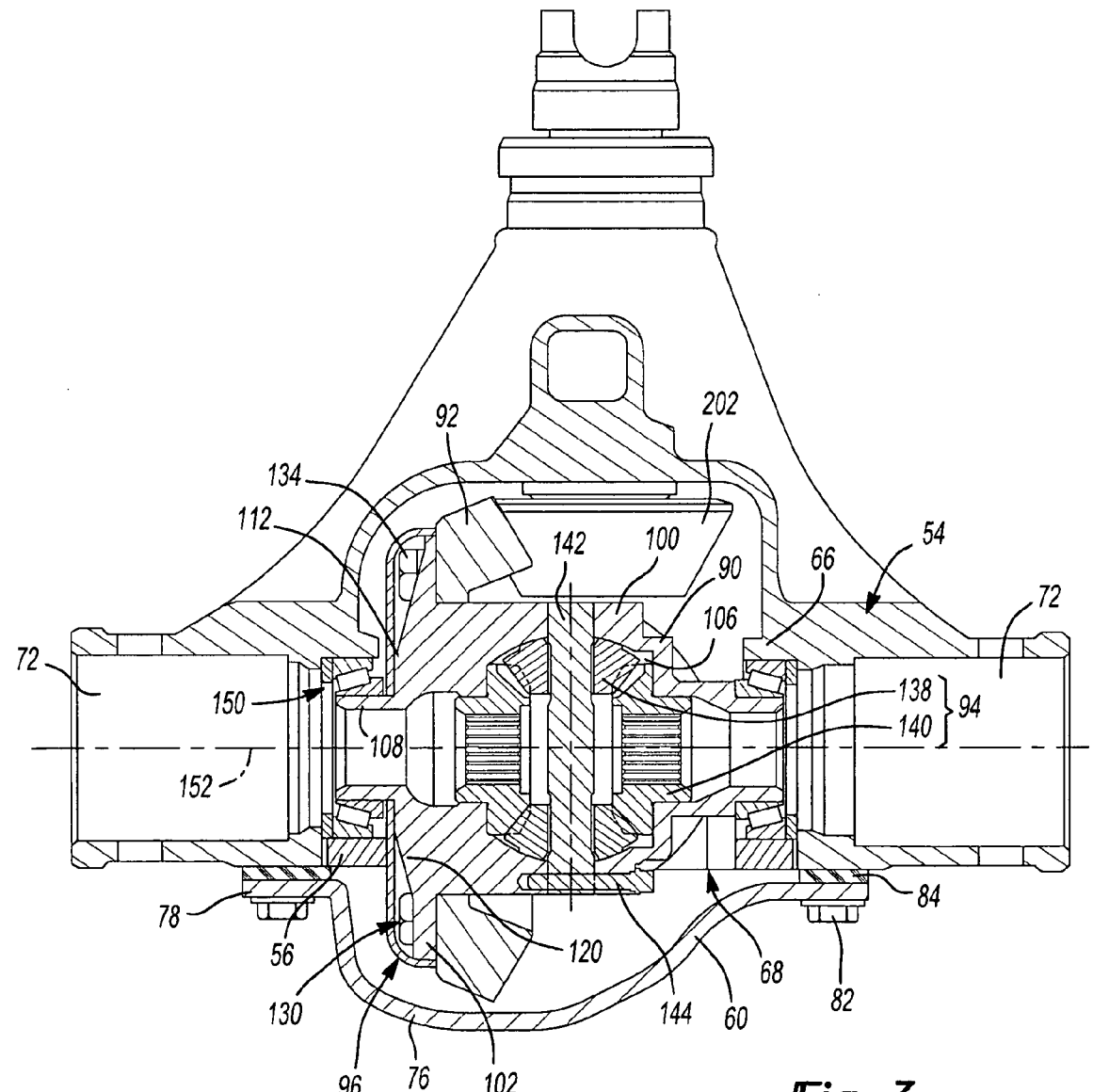
FIG. 3 is a sectional view of a portion of the rear axle of FIG. 1 taken through a rotational axis of the differential assembly and parallel to a rotational axis of the input pinion assembly.
Figure 4:
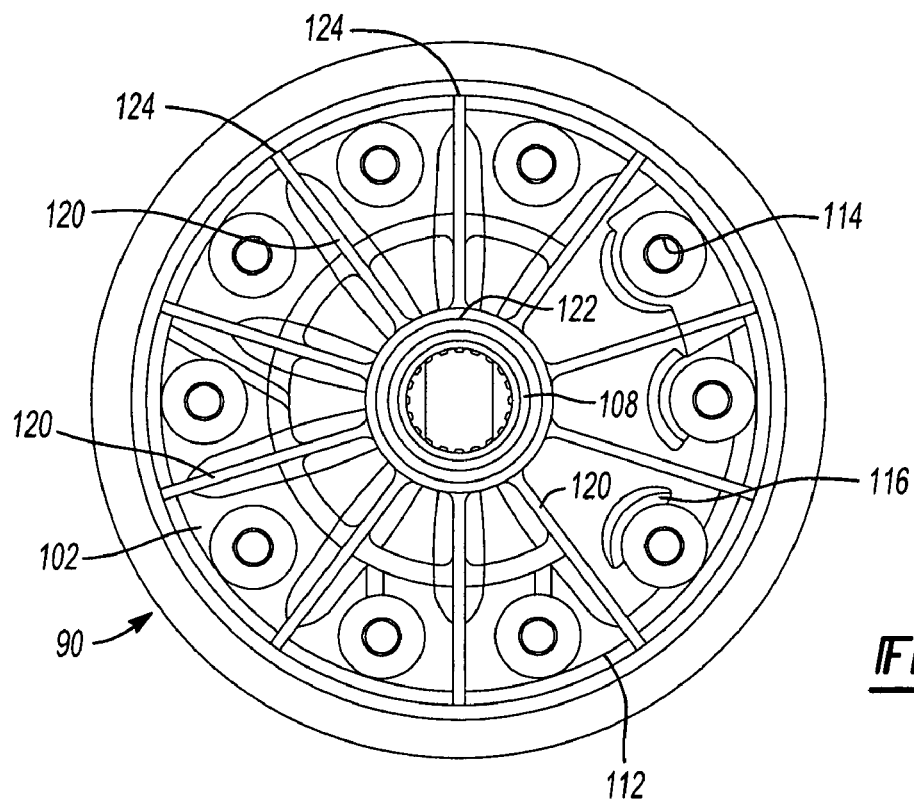
FIG. 4 is a view of a portion of the rear axle illustrating an end of the differential case of the differential assembly.

With reference to FIGS. 2 through 4, the rear axle 22 can include an axle housing assembly 40, a differential assembly 42, an input pinion assembly 44 and a pair of axle shafts 46. In the particular example provided, the axle housing assembly 40 can include a carrier housing 54, a pair of bearing caps 56, a pair of axle tubes 58 and a cover 60. The axle housing assembly 40 can define a differential cavity 62 that includes a fluid sump 64 in which a liquid lubricant (for lubricating the differential assembly 42 and input pinion assembly 44) is located. The carrier housing 54 can include a pair of bearing journals 66, a differential aperture 68, which can be disposed on a first side of the carrier housing 54, a pinion aperture 70, which can be disposed on a second side of the carrier housing 54 opposite the differential aperture 68, and a pair of axle tube apertures 72 that can intersect the opposite lateral sides of the differential cavity 62. The bearing caps 56 can be removably coupled to the bearing journals 66. The axle tubes 58 can be received in the axle tube apertures 72 and can be fixedly coupled to the carrier housing 54. The cover 60 can include a body portion 76 and a flange portion 78 that can be coupled to the carrier housing 54. The body portion 76 can be three-dimensionally contoured (e.g., bulged outwardly) to effectively increase the volume of the differential cavity 62. The flange portion 78 can extend about the body portion 76 and in the particular example provided, includes a plurality of through holes 80 that permit the cover 60 to be removably coupled to the carrier housing 54 (via a plurality of threaded fasteners 82). It will be appreciated that a gasket 84 or a sealant (not shown), such as a room-temperature vulcanizing sealant, an anaerobic sealant or a non-hardening sealant, can be employed to seal the interface between the cover 60 and the carrier housing 54.

The differential assembly 42 can include a differential case 90, a ring gear 92, a gear set 94, and an oil shield 96. The differential case 90 can include a body 100 and a flange 102. The differential case 90 is unitarily formed in the example provided, but those of skill in the art will appreciate that the differential case 90 could be formed of two or more components that can be coupled together. The body 100 can define an interior cavity 106 and a pair of trunnions 108. The flange 102 can be coupled to the body 100 and can extend radially outwardly therefrom. The flange 102 can include a flange face 112 through which a plurality of bolt holes 114 can be formed. A plurality of rib members 116 can be integrally formed with the flange face 112 and can be configured to strengthen the flange 102. In the particular example provided, the rib members 116 include a plurality of triangular-shaped, radially extending rib members 120 that have a radially inward end 122, which can be disposed adjacent or proximate one of the trunnions 108, and a radially outward end 124.

The ring gear 92 can be coupled to the flange 102 and can be meshingly engaged to the input pinion assembly 44. In the particular example provided, threaded fasteners 130, such as bolts, can be received through the bolt holes 114 in the flange 102 and threadably engaged to corresponding threaded holes 132 in the ring gear 92. The heads 134 of the threaded fasteners 130 can extend from the flange face 112. The gear set 94 can be received in the differential cavity 62 and can include a pair of pinion gears 138 that can be meshingly engaged to a pair of side gears 140. A pin 142 can be received through the pinion gears 138 and can be fixedly coupled to the differential case 90 via any desired means, such as a threaded fastener 144. The oil shield 96 can have a shallow cup-like shape and can be coupled to the differential case 90. The oil shield 96 can cover circumferentially discontinuous features, such as the radially extending rib members 120 and/or the heads 134 of the threaded fasteners 130. The differential assembly 42 can be received into the differential cavity 62 through the differential aperture 68. Differential bearings 150 can be received on the trunnions 108 and can be disposed between the bearing journals 66 and the bearing caps 56. The differential bearings 150 can cooperate to support the differential assembly 42 for rotation in the differential cavity 62 about a first rotational axis 152.

The input pinion assembly 44 can conventionally include an input shaft 200 and an input pinion 202 that can be coupled for rotation with the input shaft 200. The input pinion assembly 44 can be received into the carrier housing 54 through the pinion aperture 70 such that the input pinion 202 is meshingly engaged to the ring gear 92. A pair of bearings 204 can be coupled to the carrier housing 54 and the input shaft 200 and can support the input pinion assembly 44 for rotation about a second rotational axis 206 that can be generally perpendicular to the first rotational axis 152. An end of the input shaft 200 opposite the input pinion 202 can be adapted to be coupled to a driveline component, such as the propshaft 20 (FIG. 1), to receive rotary power therefrom.

Each of the axle shafts 46 can be received through an associated one of the axle tubes 58 and can be coupled for rotation with an associated side gear 140 in the gear set 94 of the differential assembly 42. Accordingly, it will be appreciated that rotary power input to the axle 22 via the input pinion assembly 44 is transmitted through the ring gear 92, to the differential case 90 and the gear set 94 and output to the axle shafts 46 to provide propulsive power to the left and right rear wheels 24a and 24b (FIG. 1).

Figure 5:
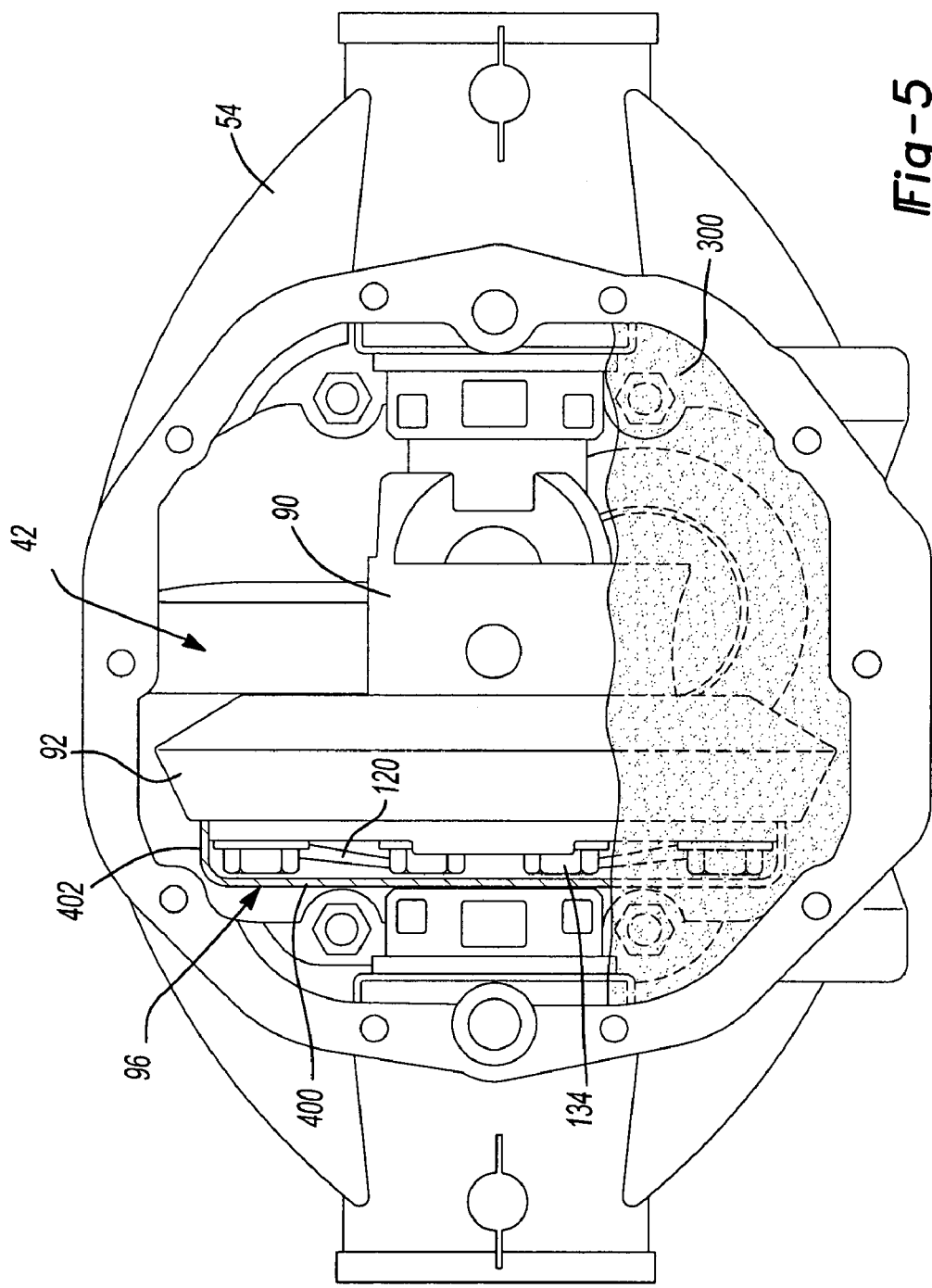
FIG. 5 is a view of a portion of the rear axle of FIG. 1 illustrating the carrier housing with the cover removed.

With reference to FIGS. 3 through 5, the differential assembly 42 is configured to rotate about the first rotational axis 152 during operation of the rear axle 22. During rotation of the differential assembly 42, lubricant 300 in the sump 64 will cling to portions of the differential assembly 42 as they pass (i.e., rotate) through the lubricant 300 in the sump 64. The lubricant 300 that clings to the differential assembly 42 can be slung from the differential assembly 42 due to centrifugal force to lubricate various portions of the rear axle 22, including the differential bearings 150. The oil shield 96 can shroud a least a portion of the circumferentially discontinuous features (e.g., the radially extending rib members 120 and the heads 134 of the threaded fasteners 130) so that these features do not directly contact the liquid lubricant 300 in the sump 64 as the differential assembly 42 rotates. Those of skill in the art will appreciate from this disclosure that if the circumferentially discontinuous features were to be permitted to directly contact the lubricant 300 in the sump 64 as the differential assembly 42 rotates, the impacting of these features against the surface of the lubricant 300 and rotation of these features through the lubricant 300 can undesirably aerate the lubricant 300 and cause foaming and/or can undesirably generate heat and parasitic friction losses. The oil shield 96 is configured to streamline the differential case 90 so that these features do not directly contact the lubricant 300 in the sump 64 as the differential assembly 42 rotates.

In the example provided, the oil shield 96 includes an annular first portion 400 and a second portion 402 that extends generally transverse to the first portion 400. The first portion 400 can be mounted on one of the trunnions 108 and the differential bearing 150 can be employed to hold the first portion 400 in a desired location relative to the differential case 90. The second portion 402 can be disposed proximate the radially outward ends 124 of the radially extending rib members 120. In the particular example provided, the oil shield 96 is press-fit to the radially outward ends 124 of the radially extending rib members 120 and the inner bearing race 410 of the differential bearing 150, which is press-fit to the trunnion 108, abuts the first portion 400 against the differential case 90 to thereby seal the oil shield 96 to the differential case 90.

Figure 6:
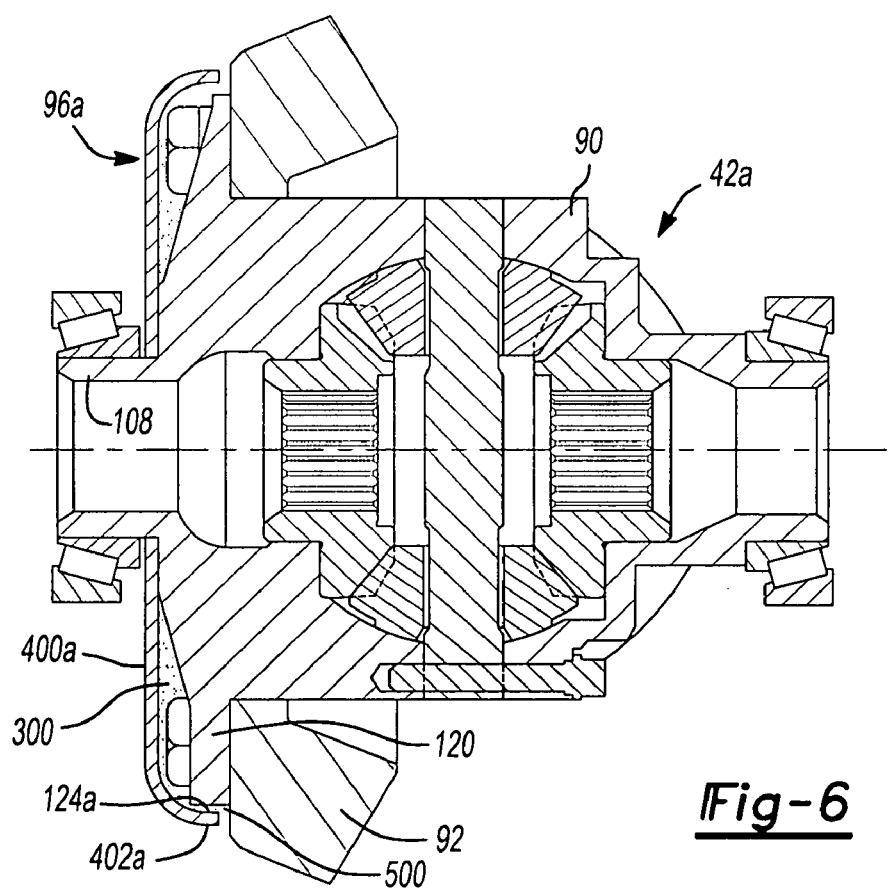
FIG. 6 is a view of a portion of another axle constructed in accordance with the teachings of the present disclosure, the view illustrating the differential assembly in longitudinal cross-section.

It will be appreciated, however, that the oil shield 96 may be configured in various different ways. For example, the oil shield 96*a* can be configured such that the first portion 400*a* is press-fit to one of the trunnions 108 and the second portion 402*a* is disposed slightly radially outward from the radially outward ends 124 of the radially extending rib members 120 as shown in FIG. 6. In this regard, a small circumferentially extending gap 500 is disposed between the second portion 402*a* of the oil shield 96*a* and the radially extending rib members 120, which permits any lubricant 300 that is contained between the oil shield 96*a* and the differential case 90 to be slung outwardly due to centrifugal force during rotation of the differential assembly 42*a*.

Figure 7:
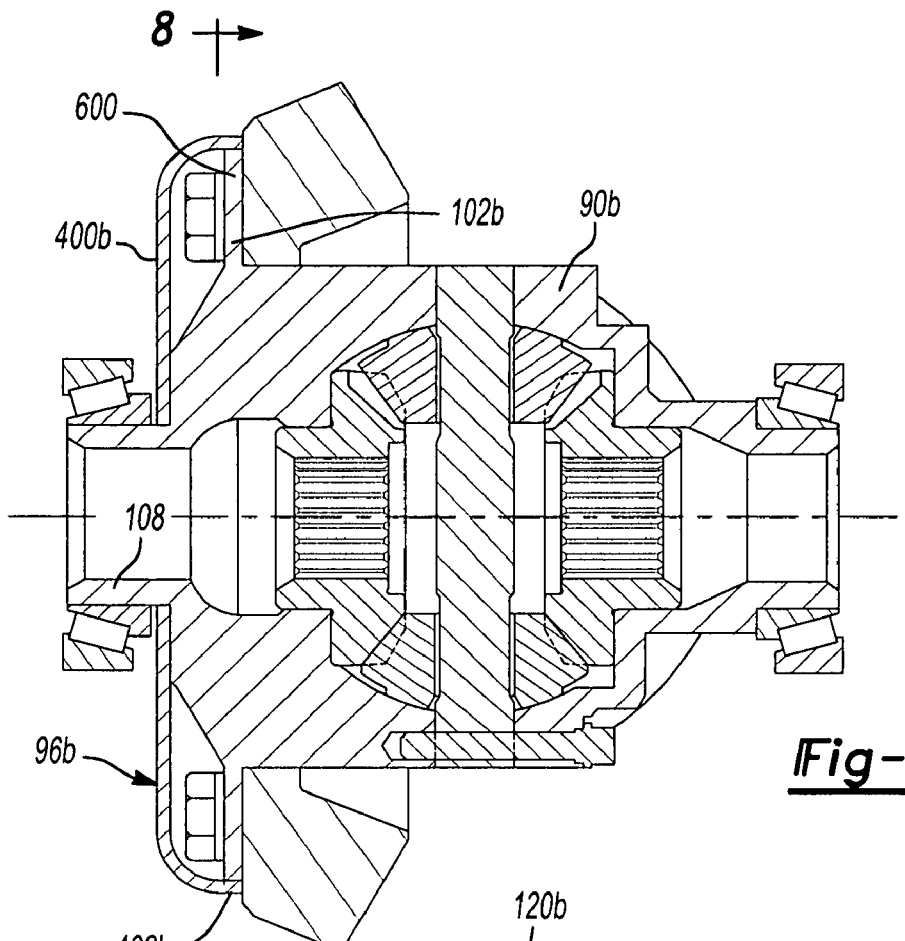
FIG. 7 is a view of a portion of yet another axle constructed in accordance with the teachings of the present disclosure, the view illustrating the differential assembly in longitudinal cross-section.
Figure 8:
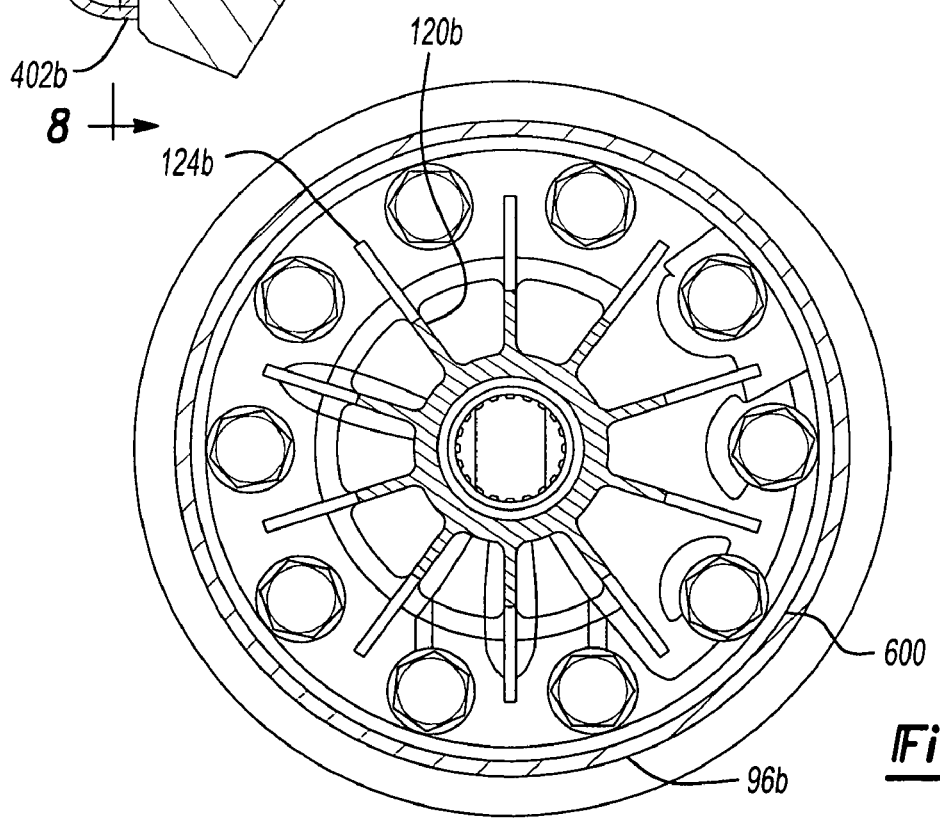
FIG. 8 is a section view taken along the line 8-8 of FIG. 7.

In the example of FIGS. 7 and 8, the oil shield 96*b* is received over the trunnion 108 of the differential case 90*b* and the second portion 402*b* of the oil shield 96*b* is press-fit to a circumferentially-extending lip 600 that is integrally formed with the flange 102*b* of the differential case 90*b*. The lip 600 can extend radially outwardly from the ends 124*b* of the radially extending rib members 120*b*. A sealant (not specifically shown) can be applied to one or both of the interior surface of the second portion 402*b* and the outer surface of the circumferentially-extending lip 600.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:
   an axle housing assembly; and
   a differential assembly mounted in the axle housing for rotation about a rotational axis, the differential assembly including a differential case, a ring gear, a gear set and an oil shield, the differential case having a body and a flange, the body defining a gear cavity, the flange being coupled to the body and including a plurality of radially outwardly extending rib members, the ring gear being coupled to the flange, the gear set being received in the gear cavity, the oil shield being press-fit to the differential case and covering at least a portion of the rib members, the at least the portion of the rib members including a radially outward end of the rib members.

2. The axle assembly of claim 1, wherein the oil shield is engaged to the radially outward ends of the rib members.

3. The axle assembly of claim 1, wherein the oil shield is spaced apart from the radially outward ends of the rib members.

4. The axle assembly of claim 1, wherein a plurality of bolts fasten the ring gear to the differential case, wherein each of the bolts includes a head and wherein the oil shield covers the heads of the bolts.

5. The axle assembly of claim 1, wherein the oil shield is sealingly engaged to the differential case.

6. The axle assembly of claim 1, wherein the axle housing assembly defines a differential cavity with a lubricant sump, wherein a liquid lubricant is received in the lubricant sump and wherein the oil shield extends radially inward to encompass any portion of the rib members that travels through the liquid lubricant when the differential case rotates about the rotational axis.

7. The axle assembly of claim 6, wherein the differential case includes a pair of trunnions and wherein a radially inward end of the oil shield is disposed adjacent to one of the trunnions.

8. The axle assembly of claim 7, wherein the oil shield is press-fit to the one of the trunnions.

9. The axle assembly of claim 6, wherein the oil shield extends radially inward to encompass each of the rib members in their entirety.

10. An axle assembly comprising:
    an axle housing assembly defining a differential cavity with a lubricant sump;
    a liquid lubricant received in the lubricant sump;
    a differential assembly mounted in the differential cavity for rotation about a rotational axis, the differential assembly including a differential case, a ring gear, a gear set and an oil shield, the differential case having a body and a flange, the body defining a gear cavity, the flange being coupled to the body and including a flange face, the flange face defining a plurality of circumferentially discontinuous features, the ring gear being coupled to the flange, the gear set being received in the gear cavity, the oil shield being coupled for rotation to the differential case;
    wherein the oil shield is press-fit to the differential case and covers a least a radially outward portion of the circumferentially discontinuous features so that the at least the radially outward portion of the circumferentially discontinuous features does not directly contact the liquid lubricant in the lubricant sump when the differential assembly rotates about the rotational axis.

11. The axle assembly of claim 10, wherein the oil shield is engaged to a radially outward end of at least a portion of the circumferentially discontinuous features.

12. The axle assembly of claim 10, wherein the oil shield is spaced apart from a radially outward end of the circumferentially discontinuous features.

13. The axle assembly of claim 10, wherein the oil shield is sealingly engaged to the differential case.

14. The axle assembly of claim 10, wherein the plurality of circumferentially discontinuous features includes a plurality of rib members that are integrally formed with the flange face of the differential case.

15. The axle assembly of claim 14, wherein the differential case includes a pair of trunnions and wherein a radially inward end of the oil shield is disposed adjacent to one of the trunnions.

16. The axle assembly of claim 15, wherein a differential bearing is coupled to the one of the trunnions, wherein the differential bearing includes an inner bearing race and wherein the inner bearing race secures the rotationally fixes the oil shield to the differential case.

17. The axle assembly of claim 14, wherein the plurality of rib members include a plurality of radially extending rib members.

18. The axle assembly of claim 14, wherein a plurality of threaded fasteners couple the ring gear to the flange and wherein the plurality of circumferentially discontinuous features include a portion of the threaded fasteners.

19. The axle assembly of claim 15, wherein the oil shield is press-fit to the one of the trunnions.

20. An axle assembly comprising:
- an axle housing assembly defining a differential cavity with a lubricant sump;
- a liquid lubricant received in the lubricant sump;
- a differential assembly mounted in the axle housing for rotation about a rotational axis, the differential assembly including a differential case, a ring gear, a gear set and an oil shield, the differential case having a body and a flange, the body defining a gear cavity, the flange being coupled to the body and including a flange face, the flange face defining a plurality of circumferentially discontinuous features, the ring gear being coupled to the flange, the gear set being received in the gear cavity, the oil shield being coupled for rotation to the differential case;
- wherein the oil shield is press-fit to the differential case and covers a least a radially outward portion of the circumferentially discontinuous features so that the at least the radially outward portion of the circumferentially discontinuous features does not directly contact the liquid lubricant in the lubricant sump when the differential assembly rotates about the rotational axis;
- wherein the plurality of circumferentially discontinuous features includes a plurality of rib members that are integrally formed with the flange face of the differential case, wherein the plurality of rib members include a plurality of radially extending rib members, wherein a plurality of threaded fasteners couple the ring gear to the flange and wherein the plurality of circumferentially discontinuous features include a portion of the threaded fasteners;
- wherein the differential case includes a pair of trunnions and wherein a radially inward end of the oil shield is disposed adjacent to one of the trunnions;
- wherein a differential bearing is coupled to the one of the trunnions, wherein the differential bearing includes an inner bearing race and wherein the inner bearing race secures the rotationally fixes the oil shield to the differential case;
- wherein the oil shield is engaged to a radially outward end of at least a portion of the circumferentially discontinuous features; and
- wherein the oil shield is sealingly engaged to the differential case.

* * * * *